United States Patent
Riffel

(10) Patent No.: US 7,671,763 B1
(45) Date of Patent: Mar. 2, 2010

(54) VEHICLE LOCATOR SYSTEM

(76) Inventor: Raymond J. Riffel, 8722 Greenback La., Orangevalle, CA (US) 95662

( * ) Notice: Subject to any disclaimer, the term of this patent is extended or adjusted under 35 U.S.C. 154(b) by 291 days.

(21) Appl. No.: 11/753,748

(22) Filed: May 25, 2007

(51) Int. Cl.
*G08G 1/123* (2006.01)
(52) U.S. Cl. ............... 340/989; 340/990; 340/426.2; 340/426.19
(58) Field of Classification Search ........... 340/539.13, 340/426.19, 426.2, 990, 991, 993, 426.17, 340/426.16, 426.1, 988, 989; 455/457, 456.1, 455/456.3, 456.6, 456, 66.1, 573, 575.1
See application file for complete search history.

(56) References Cited

U.S. PATENT DOCUMENTS

| | | | | |
|---|---|---|---|---|
| 5,892,447 A * | 4/1999 | Wilkinson | ............... | 340/573.4 |
| 6,249,107 B1 * | 6/2001 | Wolfe et al. | ................. | 320/150 |
| 6,975,884 B2 * | 12/2005 | Seick et al. | ................. | 455/559 |
| 6,992,583 B2 * | 1/2006 | Muramatsu | ............ | 340/539.32 |
| 7,338,328 B2 * | 3/2008 | Krieger et al. | ............... | 439/668 |
| 2003/0020638 A1 * | 1/2003 | Sari et al. | .................... | 340/995 |
| 2006/0046749 A1 * | 3/2006 | Pomerantz et al. | .......... | 455/457 |
| 2006/0090359 A1 * | 5/2006 | Bork | ............................ | 33/361 |
| 2006/0183486 A1 * | 8/2006 | Mullen | .................... | 455/456.1 |
| 2007/0182628 A1 * | 8/2007 | Pomerantz et al. | ...... | 342/357.06 |
| 2007/0230227 A1 * | 10/2007 | Palmer | ......................... | 363/78 |
| 2008/0167806 A1 * | 7/2008 | Wheeler et al. | ............. | 701/208 |
| 2009/0023483 A1 * | 1/2009 | Griffin et al. | ............. | 455/575.1 |

* cited by examiner

*Primary Examiner*—Daniel Wu
*Assistant Examiner*—Rufus Point

(57) ABSTRACT

A vehicle locator system is disclosed. An illustrative embodiment of the vehicle locator system includes a vehicle locator/charging unit having a unit microprocessor, a first cell phone circuitry and a first GPS and or RF circuitry connected to the unit microprocessor, a charge plug and a charge port connected to the charge plug; and a cell phone having a cell phone microprocessor, a second cell phone circuitry, a second GPS and or RF circuitry and a display connected to the cell phone microprocessor and a charge port adapted for connection to the charge port of the vehicle locator/charging unit.

5 Claims, 5 Drawing Sheets

VEHICLE LOCATOR SYSTEM

FIELD

The present invention relates to devices for locating vehicles. More particularly, the present invention relates to a vehicle locator system which can be used to locate a vehicle by notifying a user's cell phone.

BACKGROUND

In the current era of mega-stores and shopping malls, and the large parking lots and garages which accompany such facilities, it is common for vehicle drivers to forget where a vehicle is parked. This necessitates an often time-consuming and embarrassing search for the vehicle. Cell phone chargers are commonly kept in vehicles to facilitate selective charging of a cell phone while a vehicle driver is in the vehicle. Therefore, a vehicle locator system is needed which is incorporated into a cell phone charger and can be used to indicate the location of a vehicle on a user's cell phone.

SUMMARY

The present invention is generally directed to a vehicle locator system. An illustrative embodiment of the vehicle locator system includes a vehicle locator/charging unit having a unit microprocessor, a first cell phone circuitry and a first GPS and or RF circuitry connected to the unit microprocessor, a charge plug and a charge port connected to the charge plug; and a cell phone having a cell phone microprocessor, a second cell phone circuitry, a second GPS and or RF circuitry and a display connected to the cell phone microprocessor and a charge port adapted for connection to the charge port of the vehicle locator/charging unit.

BRIEF DESCRIPTION OF THE DRAWINGS

The invention will now be described, by way of example, with reference to the accompanying drawings, in which.

DETAILED DESCRIPTION

Figure 1:
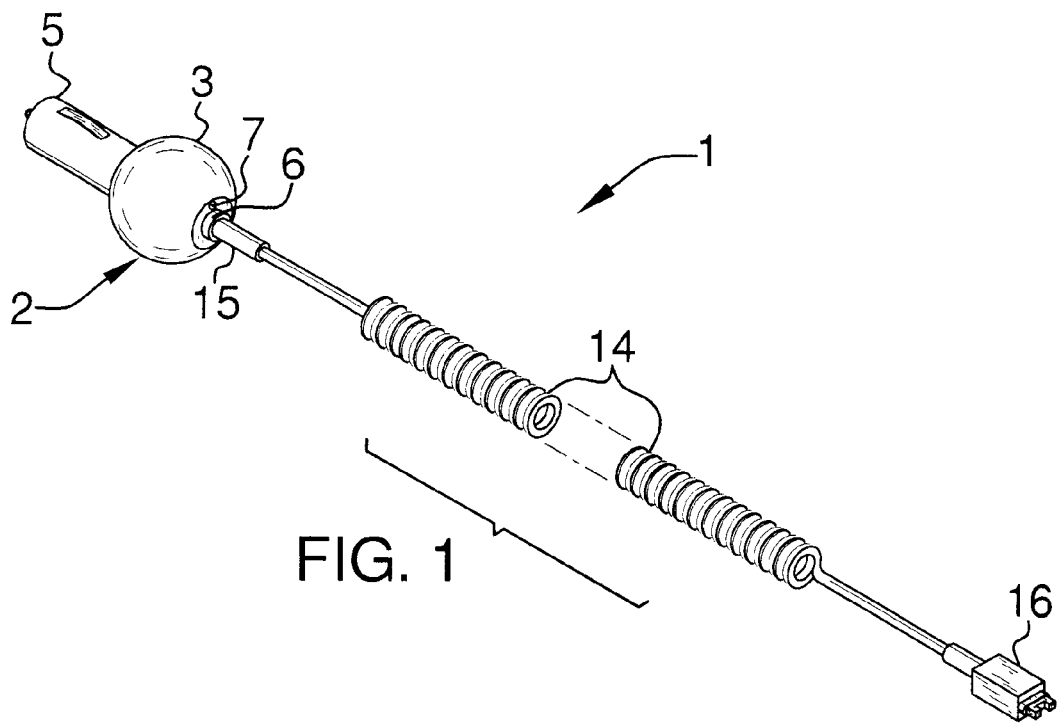
FIG. 1 is a perspective view of an illustrative embodiment of a vehicle locator element of the vehicle locator system, with a cell phone charge cord (partially in section) connected to the vehicle locator.
Figure 4:
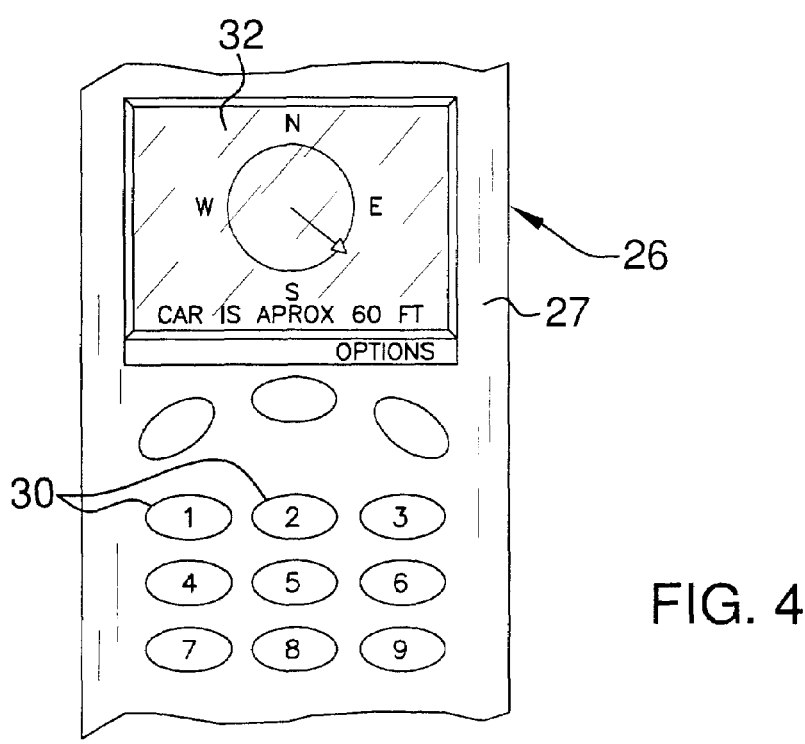
FIG. 4 is a front view, partially in section, of a cell phone element of an illustrative embodiment of the vehicle locator system.

Referring to the drawings, the vehicle locator system, hereinafter system, includes a vehicle locator 1 an illustrative embodiment of which is shown in FIG. 1. The system further includes a modified cell phone 26 which is shown in FIG. 4. In operation of the system, which will be hereinafter described, the vehicle locator 1 can be used to charge the cell phone 26 while the vehicle locator 1 is plugged into a vehicle electrical outlet (not shown) in a vehicle. When a user parks and leaves the vehicle, the cell phone 26 is disconnected from the vehicle locator 1 and carried by the user. In the event that the user encounters difficulty in locating the parked vehicle, the user can "call" the vehicle locator 1 using the cell phone 26, in which case the vehicle locator 1 indicates the location of the parked vehicle on the cell phone 26 and enables the user to expeditiously locate the vehicle.

Figure 6:
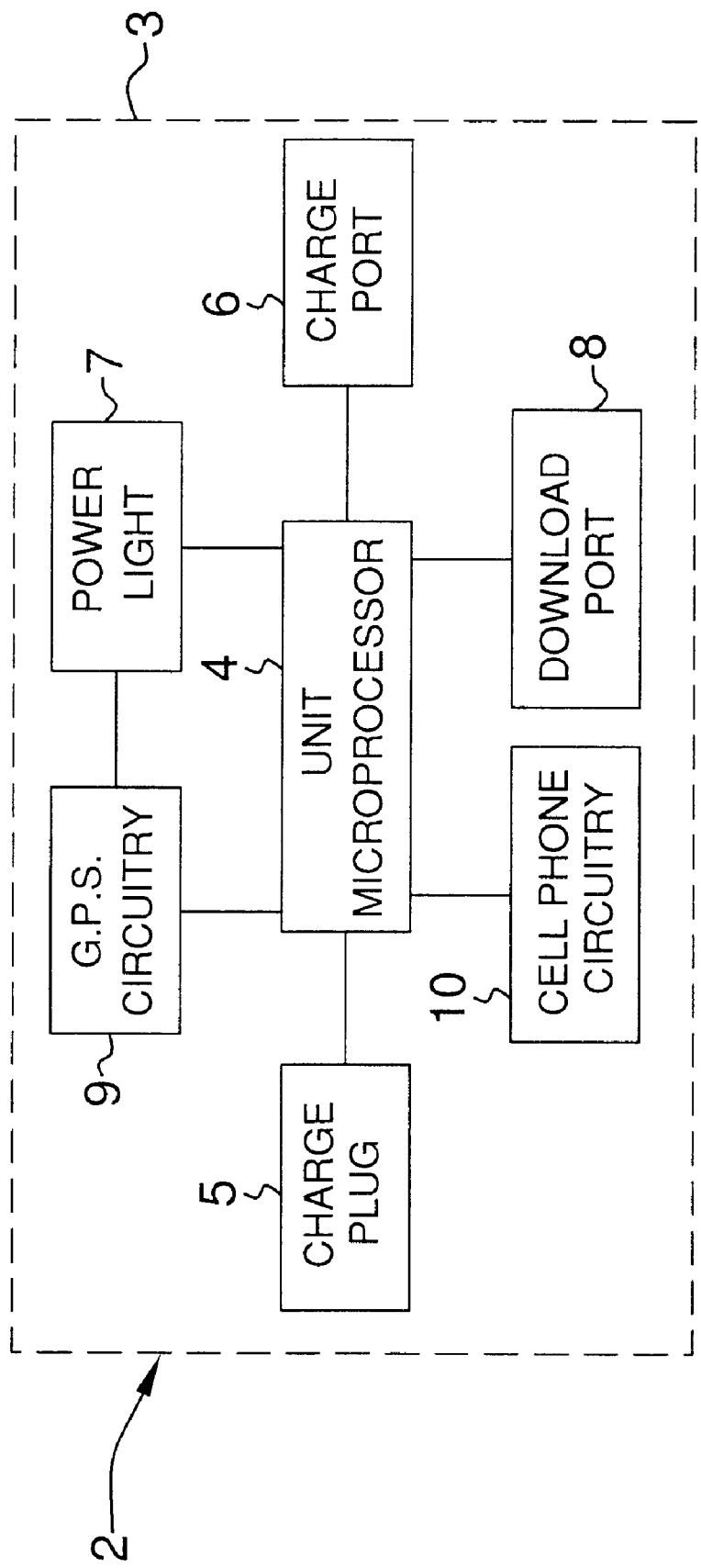
FIG. 6 is a block diagram which illustrates various functional components of the vehicle locator.

As shown in FIG. 1, the vehicle locator 1 includes a vehicle locator/charging unit, hereinafter unit, 2. The unit 2 includes a unit housing 3 which may be spherical, as shown, or any alternative shape. As shown in FIG. 6, a unit microprocessor 4 is provided in the unit housing 3. A charge plug 5 extends from the unit housing 3, as shown in FIG. 1. A charge port 6 is provided in the unit housing 3 and is electrically connected to the charge plug 5, such as through the unit microprocessor 4, for example. A power indicator light 7 may be connected to the unit microprocessor 4 and provided on the exterior of the unit housing 3 to indicate constant power when car is turned off. GPS and or RF circuitry 9 and cell phone circuitry 10, each of which may be conventional, are further connected to the unit microprocessor 4.

As further shown in FIG. 1, the charge port 6 is adapted to receive a unit plug 15 which is provided on a first end of a cell phone charge cord 14. A cell phone plug 16 is provided on a second end of the cell phone charge cord 14 for connection to a charge port 33 (FIG. 7) provided on the cell phone 26 in order to facilitate charging of the cell phone 26, as will be hereinafter further described.

Figure 2:
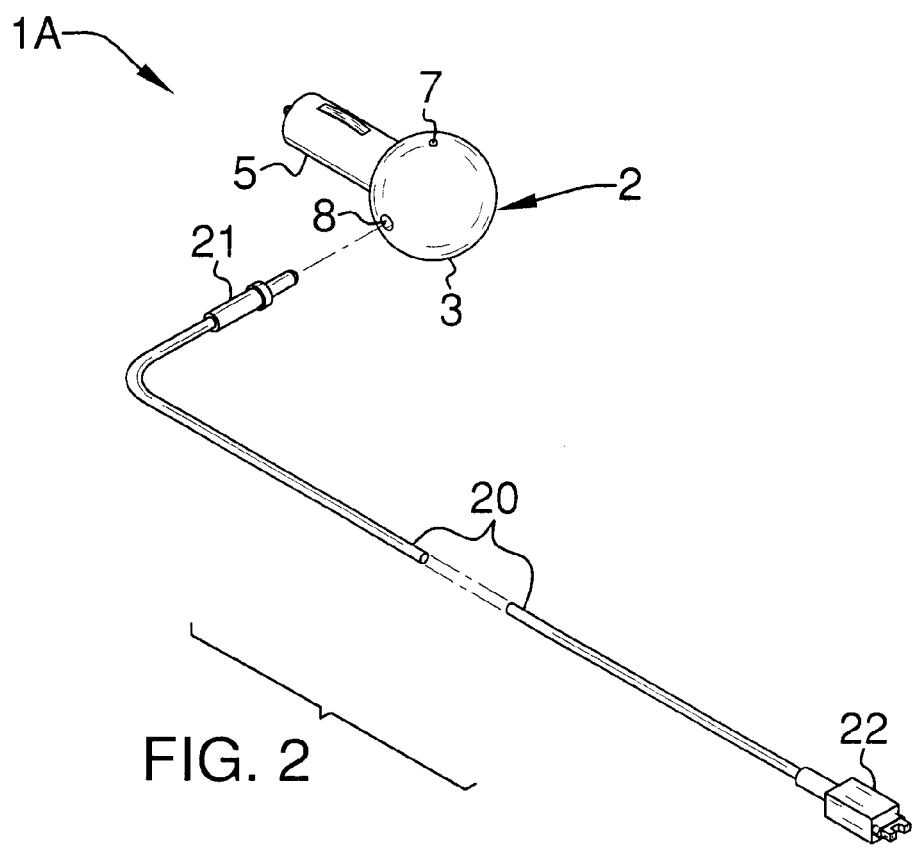
FIG. 2 is a perspective view of an alternative illustrative embodiment of the vehicle locator, with a download cord (partially in section) connected to the vehicle locator.
Figure 3:
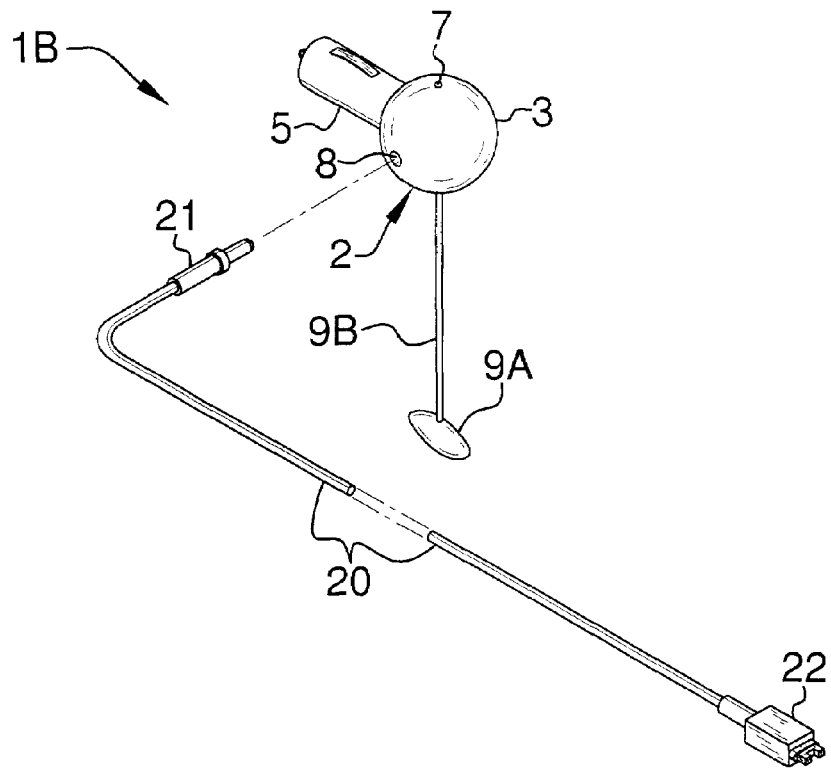
FIG. 3 is a perspective view of another alternative illustrative embodiment of the vehicle locator, with a GPS and or RF unit connected to the vehicle locator through a flexible connecting wire for better signal and illustrating typical connection of a download cord (partially in section) to a download port provided in the vehicle locator.

As shown in FIGS. 2 and 6, in some embodiments of the vehicle locator 1a, a download port 8 is provided on the unit housing 3 and connected to the unit microprocessor 4 (FIG. 6). The download port 8 is adapted to receive a unit plug 21 provided on a first end of a download cord 20. A cell phone plug 22 is provided on a second end of the download cord 20 for connection to a download port 34 (FIG. 7) provided in the cell phone 26 to facilitate downloading of information from the vehicle locator/charging unit 2 to the cell phone 26, as will be hereinafter described. As shown in FIG. 3, in some embodiments of the vehicle locator 1b, a GPS and or RF unit 9a having GPS and or RF circuitry 9 is connected to the unit microprocessor 4 (FIG. 6) through a flexible connecting wire 9b.

Figure 7:
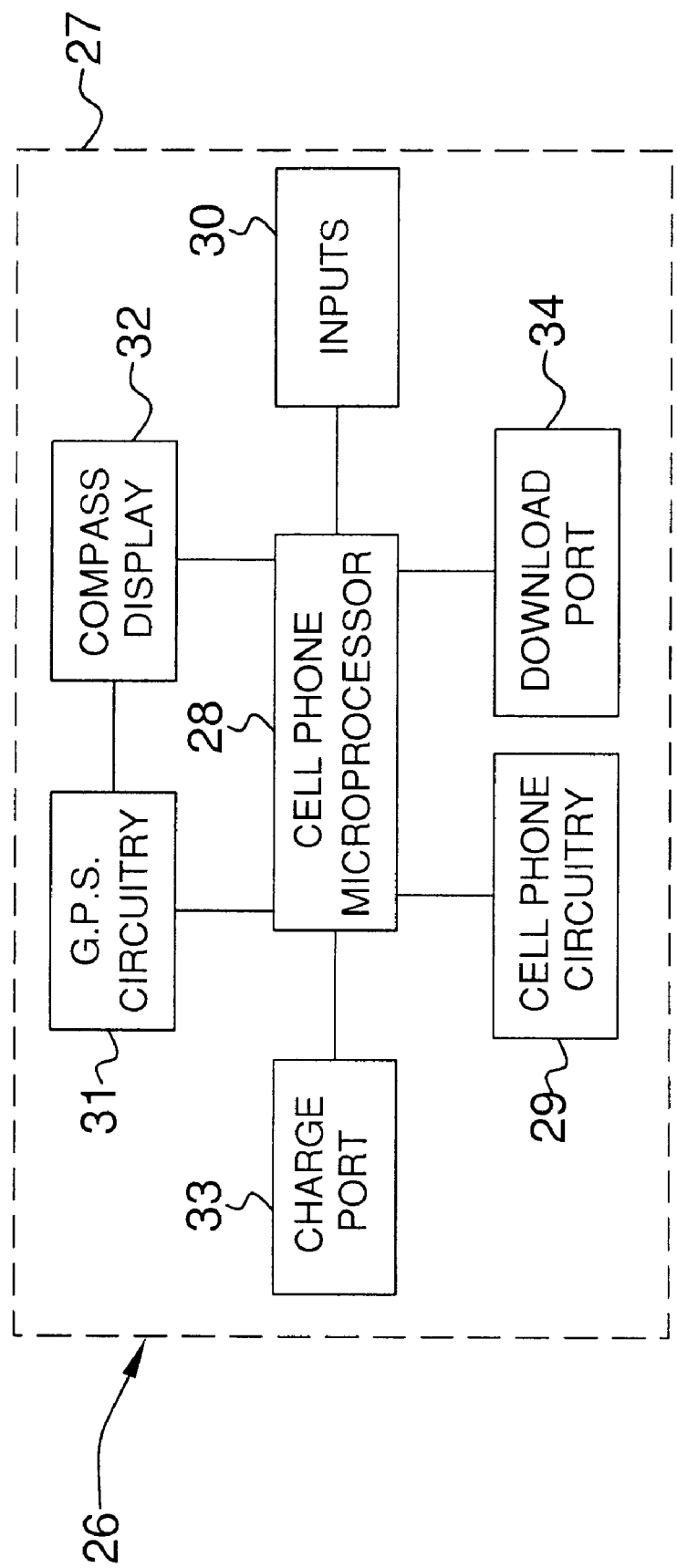
FIG. 7 is a block diagram which illustrates various functional components of the cell phone element of the vehicle locator system.

As shown in FIG. 4, the cell phone 26 includes a cell phone housing 27. As shown in FIG. 7, a cell phone microprocessor 28 is provided in the cell phone housing 27. Cell phone circuitry 29, which may be conventional, is connected to the cell phone microprocessor 28. Inputs 30, which include numerical input buttons, are connected to the cell phone microprocessor 28 and provided on the exterior of the cell phone housing 27. GPS and or RF circuitry 31, which may be conventional, is connected to the cell phone microprocessor 28. A compass display 32 is connected to the cell phone microprocessor 28 and provided on the exterior of the cell phone housing 27. The charge port 33 and the download port 34 are further connected to the cell phone microprocessor 28 and provided on the exterior of the cell phone housing 27.

The cell phone circuitry 10 of the unit 2 and the cell phone circuitry 29 of the cell phone 26 provide the communication interface between the unit 2 and the cell phone 26. The GPS and or RF circuitry 9 of the unit 2 is adapted to establish the location of the unit 2, and therefore, the vehicle (not shown)

which contains the unit 2. The GPS and or RF circuitry 31 of the cell phone 26 is adapted to establish the location of the cell phone 26. The cell phone circuitry 29 of the cell phone 26 is adapted to "call" the cell phone circuitry 10 of the unit 2, typically using the inputs 30 on the cell phone 26. In turn, the unit microprocessor 4 of the unit 2 is adapted to transmit information regarding the location of the unit 2, as established by the GPS and or RF circuitry 9, to the cell phone microprocessor 28 of the cell phone 26. Using the GPS and or RF coordinates of the unit 2 and the cell phone 26, the cell phone microprocessor 28 is adapted to establish the distance and direction of the unit 2, and therefore, the vehicle (not shown) relative to the cell phone 26. The cell phone microprocessor 28 displays this information on the compass display 32 of the cell phone 26, as shown in FIG. 4. In some embodiments, the unit microprocessor 4 of the unit 2 is also adapted to download information to the cell phone microprocessor 28 of the cell phone 26 by connecting the download port 8 of the unit 2 to the download port 34 of the cell phone 26 through the download cord 20 (FIG. 2).

In typical use of the vehicle locator system, the cell phone 26 is charged during driving of a vehicle (not shown). Accordingly, the charge plug 5 of the unit 2 is inserted in an electric outlet (not shown) inside the vehicle. The unit plug 15 of the cell phone charge cord 14 is inserted in the charge port 6 of the unit 2, and the cell phone plug 16 of the cell phone charge cord 14 is inserted in the charge port 33 (FIG. 7) of the cell phone 26. Therefore, electrical power flows from the vehicle electrical outlet; through the unit 2 and cell phone charge cord 14, respectively; and to the cell phone 26 to recharge the cell phone 26.

Figure 5:
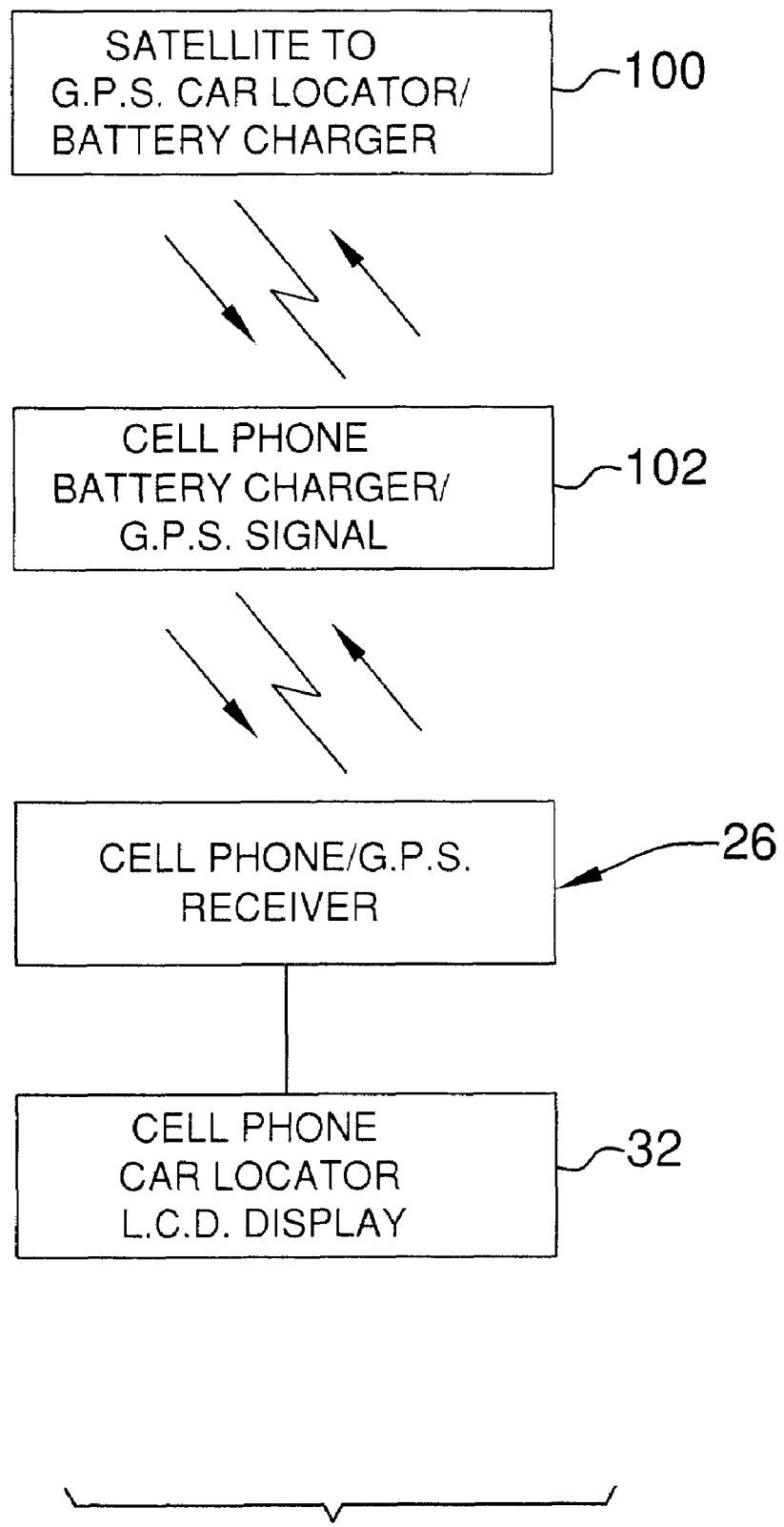
FIG. 5 is a vehicle locating/charging unit with related microchip that will send all information to the telephone without downloading material.

After parking of the vehicle, the cell phone 26 is disconnected from the cell phone charge cord 14, whereas the charge plug 5 of the unit 2 typically remains inserted in the vehicle electrical outlet. The user (not shown), typically the driver of the vehicle, carries the cell phone 26 upon leaving the vehicle. The GPS and or RF circuitry 9 of the unit 2 receives satellite signals regarding the location of the unit 2 and the vehicle, as indicated in blocks 100 and 102 in FIG. 5. In the event that the user subsequently encounters difficulty locating the vehicle upon his or her return, the user "calls" the unit 2 typically by dialing the appropriate number into the cell phone 26 using the inputs 30. As further shown in FIG. 5, the unit 2 responds by transmitting the GPS and or RF coordinates of the unit 2, as determined by the GPS and or RF circuitry 9 (FIG. 6) of the unit 2, to the cell phone microprocessor 28 of the cell phone 26 via the cell phone circuitry 10 of the unit 2 and the cell phone circuitry 29 of the cell phone 26. The cell phone microprocessor 28 determines the GPS and or RF coordinates of the cell phone 26 and, using this information and the GPS and or RF coordinates of the unit 2, displays the direction of the unit 2 with respect to the cell phone 26 and typically also the distance between the cell phone 26 and the unit 2 on the compass display 32 of the cell phone 26, as shown in FIGS. 4 and 5. This enables the user to expeditiously locate the vehicle.

While the preferred embodiments of the invention have been described above, it will be recognized and understood that various modifications can be made in the invention and the appended claims are intended to cover all such modifications which may fall within the spirit and scope of the invention.

What is claimed is:

1. A vehicle locator system, comprising:
    a vehicle locator/charging unit having a unit housing and a unit microprocessor, a first cell phone circuitry and a first GPS and or RF circuitry connected to said unit microprocessor and provided in said unit housing and a charge plug extending from said unit housing and a charge port connected to said charge plug and provided on said unit housing; and
    a cell phone having a cell phone housing, a cell phone microprocessor, a second cell phone circuitry, a second GPS and or RF circuitry provided in said cell phone housing and a compass display provided on said cell phone housing and connected to said cell phone microprocessor and a charge port provided on said cell phone housing and adapted for connection to said charge port of said vehicle locator/charging unit.

2. The system of claim 1 further comprising a cell phone charge cord having a unit plug adapted for connection to said charge port of said vehicle locator/charging unit and a cell phone plug adapted for connection to said charge port of said cell phone.

3. The system of claim 1 further comprising a first download port provided on said unit housing and connected to said unit microprocessor and a second download port provided on said cell phone housing and connected to said cell phone microprocessor and adapted for connection to said first download port.

4. The system of claim 1 further comprising a power indicator light provided on said unit housing and connected to said unit microprocessor.

5. The system of claim 1 wherein said compass display is adapted to display a direction of said vehicle locator/charging unit relative to said cell phone and a distance of said vehicle locator/charging unit from said cell phone.

\* \* \* \* \*